(12) United States Patent
Valencia Rissetto et al.

(10) Patent No.: US 12,537,034 B2
(45) Date of Patent: Jan. 27, 2026

(54) DEVICE AND METHOD FOR IN-MEMORY COMPUTING

(71) Applicant: STMicroelectronics International N.V., Geneva (CH)

(72) Inventors: Leonardo Valencia Rissetto, Montbonnot (FR); Alin Razafindraibe, Saint Martin d'Heres (FR); Xavier Lecoq, Voiron (FR); Christophe Forel, Saint-Egreve (FR)

(73) Assignee: STMicroelectronics International N.V., Geneva (CH)

( * ) Notice: Subject to any disclaimer, the term of this patent is extended or adjusted under 35 U.S.C. 154(b) by 176 days.

(21) Appl. No.: 18/441,110

(22) Filed: Feb. 14, 2024

(65) Prior Publication Data

US 2024/0290364 A1    Aug. 29, 2024

(30) Foreign Application Priority Data

Feb. 24, 2023    (FR) ...................................... 2301691

(51) Int. Cl.
*G11C 7/22*        (2006.01)
*G11C 7/10*        (2006.01)

(52) U.S. Cl.
CPC ............ *G11C 7/222* (2013.01); *G11C 7/1063* (2013.01); *G11C 7/1066* (2013.01)

(58) Field of Classification Search
CPC ..... G11C 7/222; G11C 7/1063; G11C 7/1066; G11C 7/1006; G11C 7/16; G11C 11/54; G06N 3/063; G06N 3/065
USPC ...................................................... 365/233.1
See application file for complete search history.

(56) References Cited

U.S. PATENT DOCUMENTS

| | | |
|---|---|---|
| 2020/0327401 A1 | 10/2020 | Bates et al. |
| 2020/0356848 A1 | 11/2020 | Lesso et al. |
| 2021/0064979 A1 | 3/2021 | Ido et al. |
| 2022/0027130 A1 | 1/2022 | Kashmiri et al. |

(Continued)

FOREIGN PATENT DOCUMENTS

WO    WO-2022260413 A1 *  12/2022    ............... G06N 3/04

OTHER PUBLICATIONS

Pulse-Width Modulation Based Dot-Product Engine for Neuromorphic Computing System Using Memristor Crossbar Array, Jiang Hao et al: "Pulse-Width Modulation based Dot-Product Engine for Neuromorphic Computing System using Memristor Crossbar Array", 2018 IEEE International Symposium on Circuits and Systems (ISCAS), IEEE, May 27, 2018 (May 27, 2018), pp. 1-4, XP033434722.

*Primary Examiner* — Fernando Hidalgo
(74) *Attorney, Agent, or Firm* — Crowe & Dunlevy LLC

(57) ABSTRACT

A device includes memory cells wherein each memory cell has a control input that receives a pulse-width modulated control voltage and an output that delivers a current depending on the control voltage and on a weight programmed in the memory cell. A node receives, during a first time period, the currents of the memory cells. A first circuit delivers an output determined by a total quantity of current received by the node during the first time period. For each memory cell, a second circuit receives a digital word and delivers, during the first time period, the pulse-width modulated control voltage at a first level only during a second time period determined by the digital word.

19 Claims, 3 Drawing Sheets

(56) References Cited

U.S. PATENT DOCUMENTS

| | | |
|---|---|---|
| 2022/0359617 A1 | 11/2022 | Woo et al. |
| 2023/0186089 A1* | 6/2023 | Schie .................... G06N 3/048 706/25 |

* cited by examiner

DEVICE AND METHOD FOR IN-MEMORY COMPUTING

PRIORITY CLAIM

This application claims the priority benefit of French Application for U.S. Pat. No. 2,301,691, filed on Feb. 24, 2023, the content of which is hereby incorporated by reference in its entirety to the maximum extent allowable by law.

TECHNICAL FIELD

The present disclosure generally concerns electronic devices and, in particular, electronic devices configured to implement in-memory computing (IMC) operations.

BACKGROUND

Many known applications or electronic systems use devices configured to implement in-memory computing operations. In these devices, computing operations, for example multiplications and a summing of the results of the multiplications, are at least partly directly implemented in memory cells of a memory, preferably non-volatile, of the device.

Artificial intelligence (AI), artificial neural networks (ANN), and convolutional neural networks (CNN) are examples of application using devices configured to implement in-memory computing.

However, known devices configured to implement in-memory computing suffer from various disadvantages, for example as concerns errors on the computing implemented by these known devices and/or the size (i.e., occupied circuit area) of these devices.

There exists a need to overcome all or part of the disadvantages of known devices configured to implement in-memory computing.

SUMMARY

An embodiment provides a device configured to implement in-memory computing which exhibits decreased computing errors with respect to known devices, for example when these computing errors result from PVT ("Process Voltage Temperature") variations.

For example, an embodiment provides a device configured to implement in-memory computing which has a decreased size with respect to known devices, for example when these computing errors result from PVT ("Process Voltage Temperature") variations.

An embodiment provides a device comprising: memory cells, each comprising a control input configured to receive a pulse-width modulated control voltage and an output configured to supply an output current having a value at least partly determined by a level of the control voltage of the memory cell and by a weight programmed in said memory cell; a connection node configured to receive, during a first time period, the output currents of a plurality of memory cells among said memory cells; a first circuit having an input connected to the connection node, the first circuit being configured to deliver an output signal having a value determined by a total quantity of current received by the input of the first circuit during the first time period; and for each memory cell of the plurality of memory cells, a second circuit configured to receive a digital word and to deliver, during the first time period, the control voltage to said memory cell at a first level only during a second time period determined by said digital word.

According to an embodiment, each memory cell is configured so that the value of its output current is only determined by the level of its control voltage and by the weight programmed in said memory cell.

According to an embodiment, each memory cell further comprises a selection input and is configured so that: the value of its output current is at a value, preferably zero, independent from the level of its control voltage and from the weight programmed in said memory cell if its selection input receives a selection signal in a first state; and the value of its output current is determined by the level of its control voltage, the weight programmed in the memory cell and the state of the selection signal received by its selection input if the state of the selection signal is different from the first state.

According to an embodiment, the device further comprises a selection circuit configured to deliver, to each memory cell of the plurality of memory cells, the selection signal of the memory cell.

According to an embodiment, each second circuit is configured so that the control voltage delivered by this second circuit comprises exactly two levels, said two levels comprising the first level.

According to an embodiment, the first node is connected to the output of each of the memory cells of the plurality of memory cells.

According to an embodiment, the device further comprises: a connection network having an output connected to the first node and inputs connected to the outputs of the memory cells of the plurality of memory cells; and a control circuit of said network configured, during the first time period, to control the network so that the first node receives the output current of each of the memory cells of the plurality of memory cells.

According to an embodiment, the first circuit comprises an integrator circuit configured to integrate the quantity of current received by the first circuit during the first time period and to deliver a first signal determined by said integration.

According to an embodiment, the first signal is an analog signal and the first circuit further comprises an analog-to-digital converter configured to convert the first analog signal into a digital signal determining the output signal of the first circuit.

According to an embodiment, the first circuit comprises: an oscillator having an oscillation frequency determined by a total current available on the first node, and a counter configured to deliver a digital signal having a value determined by a number of oscillations counted during the first time period, the output signal of the first circuit being determined by the digital signal delivered by the counter.

According to an embodiment, the first time period is equal to K times one period of the clock, with K a constant number, and, for each memory cell of the plurality of memory cells, the second time period is equal to Q times the clock period, with Q a number smaller than or equal to number K.

According to an embodiment, numbers K and Q are integers.

According to an embodiment, each second circuit comprises a counter configured to: receive the digital word received by said second circuit, count, during the first time period, a number of periods of the clock, and deliver, during the first time period, an output signal in a first binary state if the counted number of periods is smaller than a value determined by said digital word, and in a second binary state otherwise, said second circuit being further configured to deliver said control voltage at the first level if the output signal of the counter is in the first binary state.

According to an embodiment, number K is determined by a maximum value of the digital words and, for each memory cell of the plurality of memory cells, number Q is determined by a value of the digital word received by the second circuit delivering the control voltage to said cell.

An embodiment provides a method implemented in a device comprising memory cells, each comprising a control input configured to receive a control voltage and an output configured to supply an output current having a value at least partly determined by a level of the control voltage of the memory cell and by a weight programmed in said memory cell, the method comprising, during a first time period: supplying a connection node with the output currents of a plurality of memory cells among the memory cells of the device; delivering with a first circuit having an input connected to the first node, an output signal having a value determined by a total quantity of current received by the input of the first circuit during the first time period; and for each memory cell of the plurality of memory cells, receiving a digital word with a second circuit and delivering with the second circuit the control voltage of the memory cell at a first level only during a second time period determined by the received digital word.

BRIEF DESCRIPTION OF THE DRAWINGS

The foregoing features and advantages, as well as others, will be described in detail in the rest of the disclosure of specific embodiments given by way of illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional and material properties.

For the sake of clarity, only the steps and elements that are useful for the understanding of the described embodiments have been illustrated and described in detail. In particular, the usual memory cells used in the described devices to implement in-memory computing have not been described in detailed fashion, the described embodiments and variants being compatible with these usual memory cells. Further, the usual electronic systems and the usual applications (AI, ANN, CNN) in which one or a plurality of devices configured to implement in-memory computing are used have not been detailed, the described embodiments and variants being compatible with these usual systems and applications.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following description, when reference is made to terms qualifying absolute positions, such as terms "front", "back", "top", "bottom", "left", "right", etc., or relative positions, such as terms "above", "under", "upper", "lower", etc., or to terms qualifying directions, such as terms "horizontal", "vertical", etc., it is referred, unless specified otherwise, to the orientation of the drawings.

Unless specified otherwise, the expressions "about", "approximately", "substantially", and "in the order of" signify plus or minus 10%, preferably of plus or minus 5%.

Figure 1:
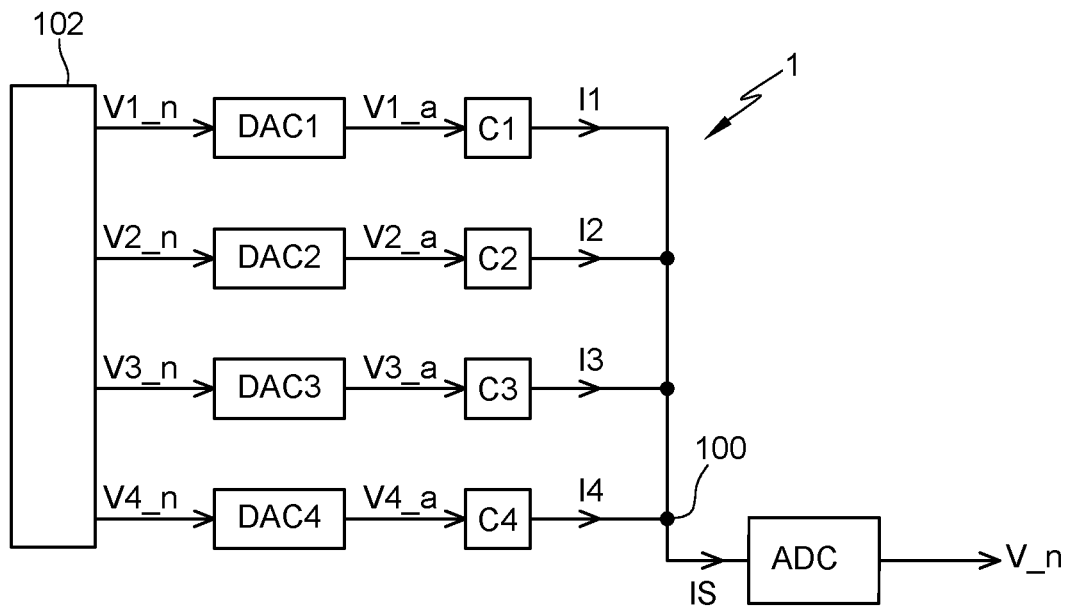
FIG. 1 schematically shows in the form of blocks an example of a device configured to implement in-memory computing.

FIG. 1 schematically shows in the form of blocks an example of a device configured to implement in-memory computing.

Device 1 comprises N identical memory cells Ci, with N being an integer greater than or equal to 2, and i being an integer index ranging from 1 to N. In the example of FIG. 1, N is equal to four and the device thus comprises N memory cells C1, C2, C3 and C4. The N memory cells Ci, for example, form part of a memory of device 1 comprising M memory cells identical to cells Ci, with M being an integer greater than or equal to N.

Each memory cell Ci comprises a control input configured to receive a control voltage $Vi\_a$, with i being an integer index ranging from 1 to N ($V1\_a$, $V2\_a$, $V3\_a$ and $V4\_a$ in FIG. 1).

Each memory cell Ci further comprises an output supplying a current Ii, with i being an integer index ranging from 1 to N (I1, I2, I3 and I4 in FIG. 1). For each memory cell Ci, current Ii has a value determined by the value of the voltage $Vi\_a$ received by memory cell Ci and by a weight Wi programmed in memory cell Ci, for example a value equal to the product of voltage $Vi\_a$ by weight Wi. As an example, the programming of a weight Wi in a memory cell Ci corresponds to a programming of a resistance value of the memory cell or of a bias current of the memory cell.

The outputs of the N memory cells Ci are all connected to a same connection node 100. Node 100 thus receives currents Ii from the N memory cells Ci.

Device 1 further comprises, for each of the N memory cells Ci, a digital-to-analog converter DACi, with i being an integer index ranging from 1 to N (DAC1, DAC2, DAC3 and DAC4 in FIG. 1). Each converter DACi is configured to receive a digital word $Vi\_n$ ($V1\_n$, $V2\_n$, $V3\_n$ and $V4\_n$ in FIG. 1), that is, a value coded in the form of a digital word, and thus of a plurality of bits. Each converter DACi is further configured to deliver to the corresponding memory cell Ci (having the same index i) the control voltage $Vi\_a$ of memory cell Ci, so that the value of voltage $Vi\_a$ is determined by digital word $Vi\_n$. In other words, each converter DACi is configured to convert the digital word $Vi\_n$ that it receives into the analog voltage $Vi\_a$ that it delivers to memory cell Ci.

As an example, device 1 comprises a circuit 102 configured to deliver digital words $Vi\_n$ to converters DACi. As an example, these digital words $Vi\_n$ are the results of a previous computing, for example a computing implemented by a previous layer of a neural network.

Device 1 further comprises an analog-to-digital converter ADC. The ADC converter has an input connected to node 100. Thus, the input of the ADC converter receives a current IS equal to the sum of currents Ii. The ADC converter is configured to deliver a digital output word $V\_n$ corresponding to the result of the analog-to-digital conversion of current IS.

Thus, in operation, device 1 enables to implement an in-memory computing consisting of N multiplications $Vi\_n*Wi$, that is, N multiplication $Vi\_a*Wi$, and the summing of the result of the N multiplications. The result of this sum, that is, current IS in FIG. 1, is then converted by the ADC circuit to obtain word $V\_n$.

However, in device 1, the greater the number N of multiplications, the greater the number of converters DACi, and thus the size of device 1, increases.

Further, the ADC circuit for converting current IS into digital word $V\_n$ is sensitive to process, voltage, temperature (PVT) variations, whereby errors linked to PVT variations may be introduced into result $V\_n$ by the ADC converter. Similarly, circuits DACi are sensitive to PVT variations, whereby errors linked to PVT variations may be introduced on the values of voltages $Vi\_a$, and thus on result $V\_n$.

Further, when digital words $Vi\_n$ may take X distinct values, with X greater than 2, not only must converters DACi have an accuracy, or resolution, sufficient to deliver analog control voltages $Vi\_a$ capable of taking X distinct corresponding values, but, further, each memory cell Ci must enable to deliver, for each value of weight Wi capable of being programmed in this memory cell, a current Ii capable of taking X distinct corresponding values, which makes device 1 complex to implement. However, this implies providing an ADC circuit having a sufficient resolution.

There is here provided a device and a method for the implementation of in-memory computing where memory cells similar to the previous memory cells Ci are each controlled by a pulse-width modulated binary control voltage based on the value of the corresponding digital word.

This enables to avoid the use of digital-to-analog converters to generate the control voltages of the memory cells based on the digital words.

This further enables to simplify the implementation of a circuit of the device delivering a signal representative of the result of the in-memory computing based on the output currents of the memory cells, and/or to make this circuit more robust against PVT variations.

Figure 2:
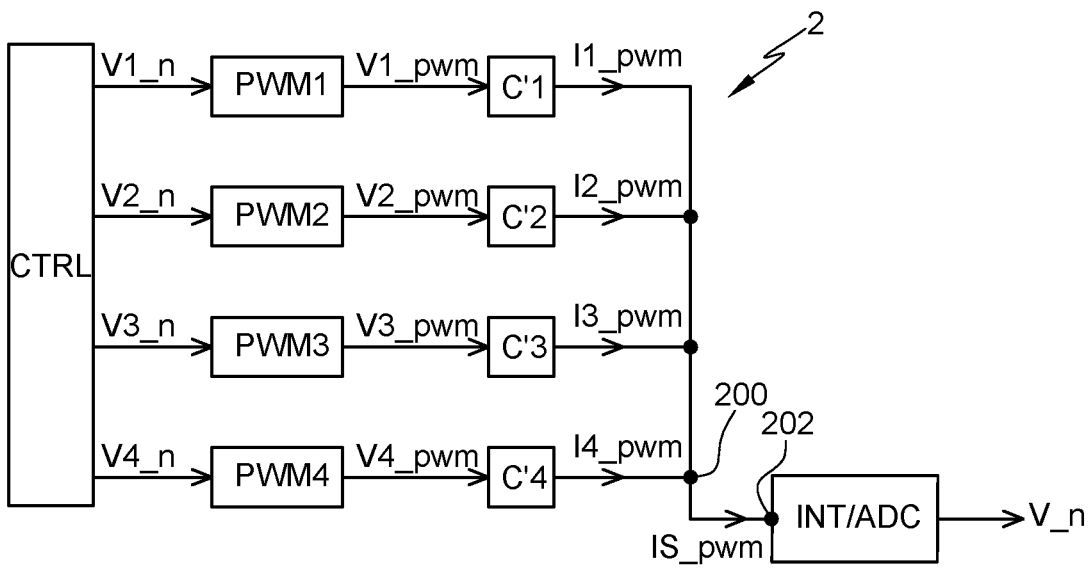
FIG. 2 schematically shows in the form of blocks an example of embodiment of a device configured to implement in-memory computing.

FIG. 2 schematically shows in the form of blocks an example of embodiment of a device 2 configured to implement in-memory computing.

Similarly to device 1, device 2 comprises N identical memory cells C'i, with N being an integer greater than or equal to 2, and i being an integer index ranging from 1 to N. In the example of FIG. 2, N is equal to four and the device thus comprises N memory cells C'1, C'2, C'3, and C'4.

The N memory cells C'i for example form part of a memory of device 2 comprising M memory cells identical to memory cells C'i, with M being an integer greater than or equal to N.

As an example, when device 2 comprises a number M of memory cells identical to the N memory cells C'i, with M greater than N, the M memory cells are for example arranged in an array of memory cells comprising rows and columns of memory cells. In this case, the N memory cells C'i for example form part of a same column of the array.

However, in other examples, the N memory cells Ci' may form part of different rows and/or columns of the array of M memory cells.

Each memory cell C'i comprises a control input configured to receive a control voltage $Vi\_pwm$, with i being an integer index ranging from 1 to N ($V1\_pwm$, $V2\_pwm$, $V3\_pwm$ and $V4\_pwm$ in FIG. 2). Voltages $Vi\_pwm$ are voltages only taking two levels, that is, a first high level and a second low level. Preferably, the low level of each voltage $Vi\_pwm$ corresponds to a zero voltage $Vi\_pwm$.

The control input of each memory cell C'i for example corresponds to a row selection input of an array of M memory cells identical to memory cells Ci'. In this case, all the memory cells of a same row of the array receive, for example, the same voltage $Vi\_pwm$, the latter being delivered to the memory cells of the row of the array by a conductive line, for example called word line, connected to the control input of each of the memory cells of this row of the array.

To deliver during a first time period D1 the control voltages $Vi\_pwm$ to the N memory cells C'i based on the digital words $Vi\_n$, device 2 comprises, for each memory cell C'i, a circuit PWMi, with i being an integer index ranging from 1 to N (PWM1, PWM2, PWM3, PWM4 in FIG. 2).

Each circuit PWMi is configured to receive the corresponding digital word $Vi\_n$, and to deliver, during time period D1, the corresponding control voltage $Vi\_pwm$ to the concerned memory cell C'i.

Each circuit PWMi is configured so that, during time period D1, voltage $Vi\_pwm$ is at its first high level during a second time period D2 determined by digital word $Vi\_n$, that is, by the value of digital word $Vi\_n$.

For example, for each voltage $Vi\_pwm$, the ratio of time period D2 to time period D1 is minimum and zero when the corresponding word $Vi\_n$ is zero, that is, represents a zero value, and this ratio D2/D1 is maximum and equal to 1 when word $Vi\_n$ is maximum, that is, represents a maximum value. In other words, during time period D1, the duty cycle D2/D1 of each voltage $Vi\_pwm$ is determined by the value of the corresponding digital word $Vi\_n$.

As an example, in device 2, words $Vi\_n$ are delivered to circuits PWMi by a control circuit CTRL of device 2. As an example, when the N memory cells C'i form part of an array of M identical memory cells, circuit CTRL is a circuit for controlling the rows of the array.

In device 2, for each implemented in-memory computing, time period D1 is constant and common to the assembly of N memory cells C'i utilized in the in-memory computing.

According to an embodiment, although this is not illustrated in FIG. 2, time period D1 corresponds to a constant number K of cycles of a clock clk of device 2. Preferably, number K is an integer, which simplifies the implementation of device 2 with respect to a case where number K is a decimal number.

In such an embodiment, for each memory cell C'i, the duration D2 of the first high level of the corresponding control voltage $Vi\_pwm$ corresponds to a number Q of periods of clock clk of device 2. Preferably, number Q is an integer, which simplifies the implementation of device 2 with respect to a case where number K is a decimal number.

However, in alternative embodiments, voltages $Vi\_pwm$, which each have a ratio of time periods D2/D1 determined by the corresponding word $Vi\_n$, are generated with usual circuits for generating a pulse-width modulated voltage and time periods D1 and D2 then do not necessarily correspond to numbers, respectively K and Q, of periods of a clock clk of device 2.

Preferably, when times periods D1 and D2 correspond to respective numbers K and Q of periods of clock clk of device 2, number K is determined by the maximum value taken by words Vi_n, and number Q is determined, for each memory cell C'i, or, in other words, for each circuit PWMi, by the value of the word Vi_n received by this circuit PWMi.

Preferably, when durations D1 and D2 correspond to integer numbers, respectively K and Q, of periods of clock clk, number K is equal to the total number of values that each word Vi_n can take minus 1. In this case, each value of word Vi_n corresponds to an integer value of Q in the range from 0 to K−1, for example a zero value when word Vi_n is zero, and a maximum value equal to K when word Vi_n is maximum. This further simplifies the implementation of device 2.

Each memory cell C'i further comprises an output supplying a current Ii_pwm, with i being an integer index ranging from 1 to N (I1_pwm, I2_pwm, I3_pwm, and I4_pwm in FIG. 2). Each memory cell C'i is configured to supply current Ii_pwm at a value at least partly determined by the product of the voltage Vi_pwm that it receives by the weight Wi programmed in the memory cell. Preferably, when a memory cell C'i receives a voltage Vi_pwm at the low level, the current Ii_pwm that it supplies is zero.

According to an embodiment, each memory cell C'i is configured to supply a current Ii_pwm at a value only determined by the level of the voltage Vi_pwm that it receives and by the weight Wi programmed in the memory cell.

As a variant not illustrated in FIG. 2, each memory cell C'i further comprises a selection input. The selection input of memory cell C'i is configured to receive a selection signal, preferably a selection voltage.

In such a variant, each memory cell C'i is configured to supply a current Ii_pwm having a value determined by the level of the voltage Vi_pwm that it receives, by the weight Wi programmed in the memory cell, and by the value of the selection voltage that it receives, for example a value determined by the product of voltage Vi_pwm, of weight Wi, and of the selection voltage of the memory cell.

This selection input of each memory cell C'i corresponds, for example, to a column selection input when memory cells C'i form part of an array of M memory cells. In this case, all the memory cells of a same column of the array receive, for example, the same selection voltage, the latter being delivered to the memory cells of the column of the array by a conductive line, for example called bit line, connected to the selection input of each of the memory cells of this column of the array.

Preferably, in such a variant, each memory cell C'i is configured to supply its current Ii_pwm at a zero value if the selection signal that it receives is in a first state, for example a first state corresponding to a zero value of the selection signal.

As an example, when the selection signal delivered to a memory cell C'i can take at least two other states in addition to the first state, this enables to weight the value of the weight Wi programmed in the memory cell with the selection signal of this memory cell.

Device 2 comprises a connection node 200. Node 200 is configured to receive, during the first time period D1, that is, over the entire time period D1, the output currents Ii_pwm of the N memory cells C'i.

According to an embodiment, as illustrated in FIG. 2, node 200 is connected to the outputs of all the N memory cells C'i, and node 200 may further be connected to outputs of other memory cells among the M memory cells of device 1.

As a variant not illustrated in FIG. 2, node 200 is coupled to the outputs of the N memory cells C'i by a connection network having inputs connected to the outputs of N memory cells C'i and, for example, to outputs of other memory cells among the M memory cells of device 2.

Device 2 then comprises a circuit for controlling the connection network configured to control the connection network so that, during time period D1, that is, during the entire time period D1, node 200 receives the output currents Ii_pwm of the N memory cells C'i. As an example, when connection network is connected to the outputs of other memory cells than the N memory cells C'i, the control circuit of the connection network is further configured so that, over the entire time period D1, the outputs of these other memory cells are electrically insulated from node 200 by the connection network.

Device 2 also comprises an integration and analog to digital conversion circuit INT/ADC. An input 202 of circuit INT/ADC is connected to node 200. Thus, circuit INT/ADC receives, during time period D1, the sum IS_pwm of the output currents I1_pwm, I2_pwm, I3_pwm, and I4_pwm supplied by the N memory cells C'1, C'2, C'3, and C'4 which have their outputs electrically coupled to node 200 during time period D1. Circuit INT/ADC is configured to deliver, based on the sum IS_pwm of the currents Ii_pwm that it receives from node 200, a signal V_n having a value determined by a total quantity of current IS_pwm received by its input 202 over the entire time period D1. Preferably, signal V_n is a digital word, that is, a digital signal over a plurality of bits, coding a value determined by the total quantity of current received by the input 202 of the circuit over the entire period D1.

According to an embodiment, to deliver signal V_n based on the total quantity of current IS_pwm received by its input 202 during a time period D1, circuit INT/ADC comprises an integrator circuit (not shown in FIG. 2) configured to integrate the quantity of current IS_pwm received over the entire time period D1, that is, to calculate, or determine, the total quantity of current received by input 202 during period D1. The integrator circuit then delivers a signal representative of the total quantity of current received by its input 202 during period D1.

As an example, the integrator circuit is an analog circuit having an input coupled, preferably connected, to the input 202 of circuit INT/ADC. In this case, the signal delivered by the integrator circuit is an analog signal. Circuit INT/ADC may then comprise an analog-to-digital converter configured to deliver a digital word resulting from the analog-to-digital conversion of the output signal of the integrator circuit, and signal V_n is determined based on this digital word. As a variant, signal V_n is an analog signal determined by the output signal of the integrator circuit and circuit INT/ADC comprises no analog-to-digital converter.

As an alternative example, the integrator circuit is a digital circuit. In this case, circuit INT/ADC comprises an analog-to-digital converter having an input coupled, preferably connected, to the input 202 of circuit INT/ADC, and which converts the signal IS_pwm received during a time period D1 into digital samples at an acquisition frequency greater, for example at least 10 times greater, than the inverse of time period D1. The integrator digital circuit receives these digital samples and integrates them, that is, here sums them up, to deliver a digital signal representative of the total quantity of current IS_pwm received during this time period D1. Signal V_n then is a digital signal determined based on the output digital signal of the integrator circuit.

As an alternative embodiment, to deliver signal V_n based on the total quantity of current IS_pwm received by its input 202 during a time period D1, circuit INT/ADC comprises an oscillator (not shown in FIG. 2), having an oscillation frequency determined by the current IS_pwm received by input 202. For example, the oscillator is powered with current IS_pwm, so that when the value of current IS_pwm changes, the frequency of the oscillations correspondingly changes. The oscillator is, for example, a ring oscillator. In such a variant, circuit INT/ADC further comprises a counter configured to deliver a digital output signal having a value determined by a counted number of oscillations of the oscillator during this time period D1, that is, over this entire time period D1. Thus, the number of counted oscillations is representative of the total quantity of current IS_pwm received during time period D1, and the output signal V_n of circuit INT/ADC is then determined based on the output signal of the counter.

While in device 1 of FIG. 1, the instantaneous value of the current Ii of each memory cell Ci is representative of the product of voltage Vi_a (and thus of the value of word Vi_n) by the weight wi programmed in this memory cell, in device 2 of FIG. 2, due to the fact that voltages Vi_pwm are pulse-width modulated voltages based on words Vi_n, the total quantity of current Ii_pwm supplied by each memory cell C'i over the entire time period D1 is representative of the product of voltage Vi_pwm (and thus of the value du word Vi_n) by the weight Wi programmed in this memory cell.

This enables to simplify device 2 with respect to device 1 due to the fact that voltages Vi_pwm only take two levels, conversely to voltages Vi_a.

Further, this enables to make device 2 smaller in occupied circuit area than device 1 due to the fact that the N circuits DACi are replaced with N circuits PWMi and that circuits PWMi are smaller in occupied circuit area than circuits DACi.

This also enables to improve the computing accuracy, due to the fact that circuits PWMi, and thus voltages Vi_pwm, are less sensitive to PVT variations than circuits DACi, and thus than voltages Vi_a.

Figure 3:
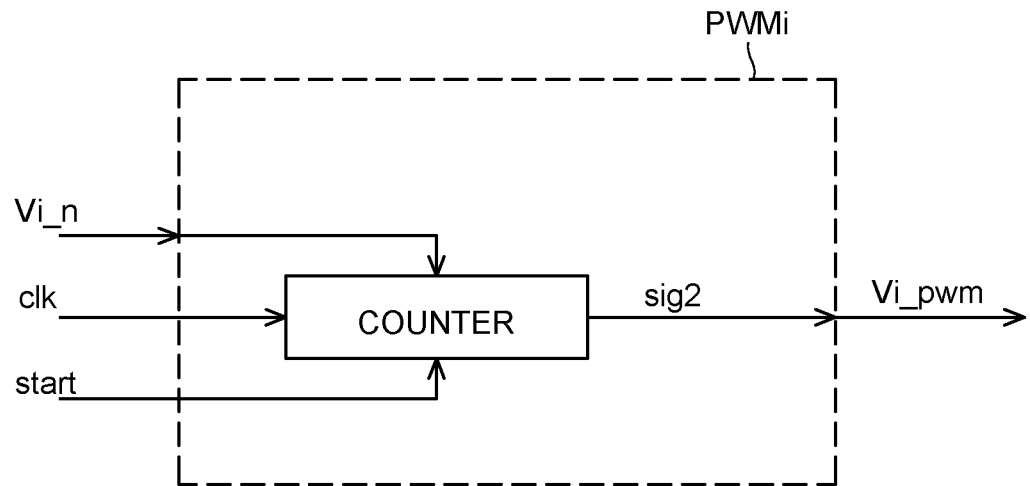
FIG. 3 schematically shows in the form of blocks an example of embodiment of a circuit of the device of FIG. 2.

FIG. 3 schematically shows in the form of blocks an example of embodiment of a circuit PWMi of the device 2 of FIG. 2, in the case where time periods D1 and D2 correspond to numbers K and Q of periods of a clock clk of the device 2 of FIG. 2. Preferably, all the circuits PWMi are identical.

In this example of embodiment, circuit PWMi comprises a counter COUNTER rated at the frequency of clock clk. Circuit PWMi and counter COUNTER then each receive clock clk. Counter COUNTER also receives digital word Vi_n. To know the beginning of time period D1, circuit PMW_i and circuit COUNTER each receive a signal start indicating, for example by a switching between two states of signal start, the beginning of each time period D1.

During each time period D1, counter COUNTER is configured to count the number of periods of clock clk. As long as the counted number is smaller than a value determined by word Vi_n, counter COUNTER delivers a binary signal sig2 in a first state, and in a second binary state otherwise, that is, as soon as the counter number of periods of clock clk reaches this value or is higher than this value.

Signal Vi_pwm is then determined based on signal sig2.

For example, when the first state of signal sig2 is a high state and the second state of signal sig1 is a low state, signal Vi_pwm corresponds or is equal to signal sig2. In other words, voltage Vi_pwm is at its first high level if signal sig2 is in its first binary state, and voltage Vi_pwm is at its second low level if signal sig2 is in its second binary state.

As an alternative example, when the first state of signal sig2 is a low state and the second state of signal sig1 is a high state, signal Vi_pwm corresponds, or is equal to, a signal complementary (or inverse) to signal sig2.

As another alternative example, voltage Vi_pwm is obtained at the output of a circuit, for example a voltage-dividing bridge, configured to adapt the values of the high and low levels of voltage Vi_pwm with respect to the level of the first and second binary states of signal sig2 or of its binary complement.

Those skilled in the art will be capable of providing other implementations of circuit PWMi based on a counter. For example, word Vi_n may be delivered to a digital comparator also receiving a digital output word of the counter indicating the number of periods of clock clk counted since the beginning of a period D1 indicated by signal start. For example, the counter is reset at each beginning of a time period D1 and the comparator delivers a binary signal in a first state as long as the digital output word of the counter is smaller than word Vi_n, and in a second binary state otherwise, voltage Vi_pwm being determined based on the binary output signal of the comparator.

Figure 4:
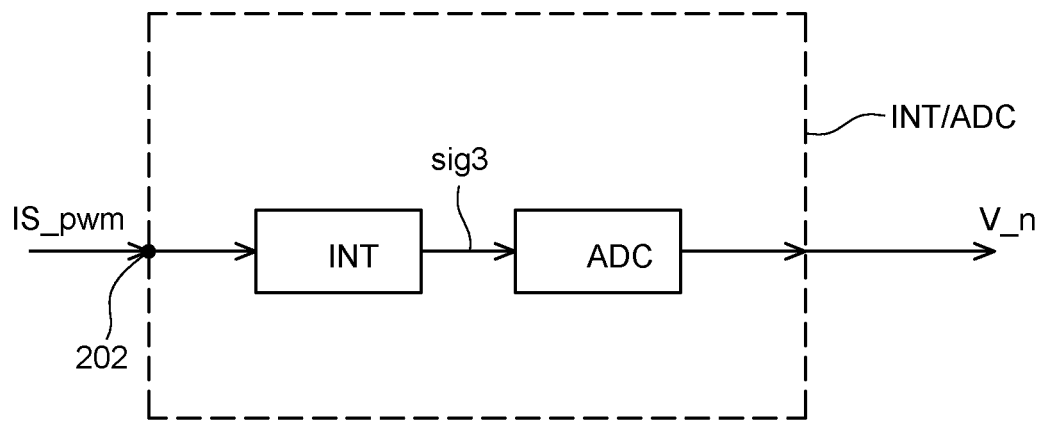
FIG. 4 schematically shows in the form of blocks an example of embodiment of another circuit of the device of FIG. 2.

FIG. 4 schematically shows in the form of blocks an example of embodiment of the circuit INT/ADC of the device 2 of FIG. 2.

More particularly, FIG. 4 illustrates an example of embodiment previously described in relation with FIG. 2, where: circuit INT/ADC comprises an integrator circuit INT configured to integrate the quantity of current IS_pwm received during time period D1, and to deliver an analog signal sig3 representative of this integration, that is, of the result of this integration; and circuit INT/ADC may comprise an analog-to-digital converter ADC configured to deliver a digital word resulting from the analog-to-digital conversion of the output signal sig3 of the integrator circuit, signal V_n being determined based on this digital output word of the ADC converter, for example being equal to this digital output word of the ADC converter.

Figure 5:
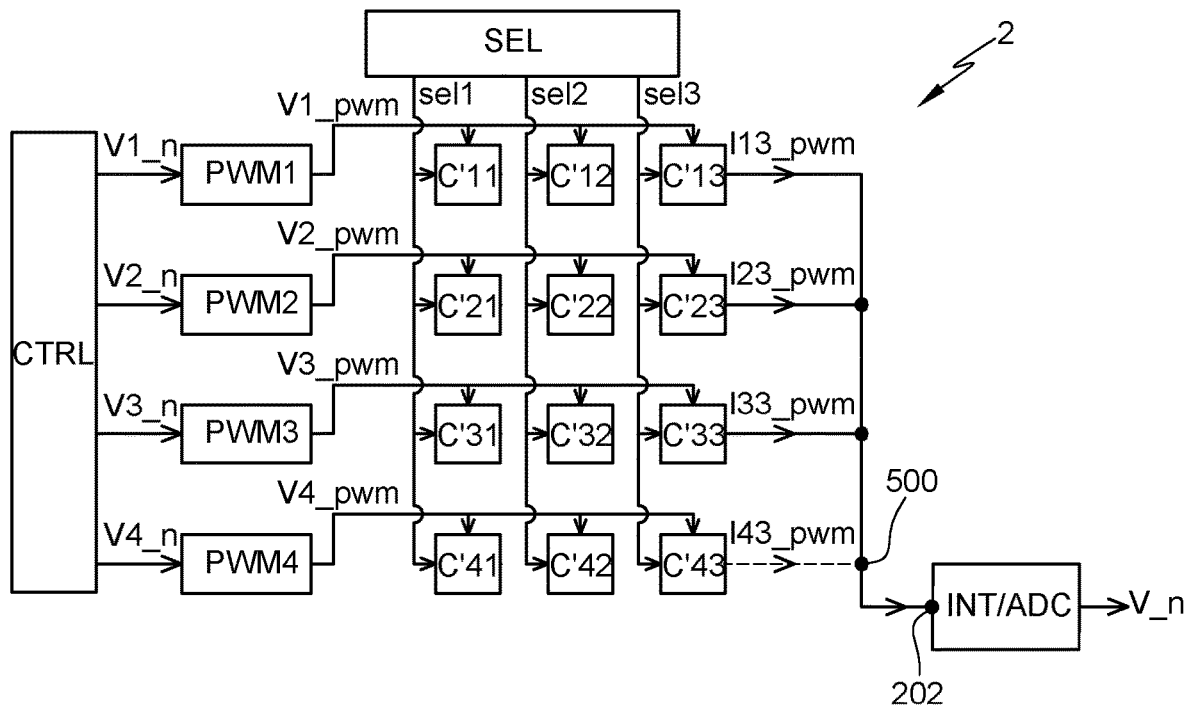
FIG. 5 schematically shows in the form of blocks another example of embodiment of a device configured to implement in-memory computing.

FIG. 5 schematically shows in the form of blocks another example of embodiment of device 2.

In this example, device 2 comprises M identical memory cells C'ku, with k being an integer index ranging from 1 to P and u being an integer index ranging from 1 to L and M equal to L times P. Memory cells C'ku are identical to the memory cells C'i previously described in relation with FIG. 2.

Further, memory cells C'ku are organized in an array of P rows (horizontal in FIG. 5) and L columns (vertical in FIG. 5).

In the example of FIG. 5, P is equal to 4 and L is equal to 3, and thus M is equal to 12.

In this example, in each row, each memory cell C'ku of the row of index k receives control voltage Vk_pwm on its control input, with k being an integer index ranging from 1 to P.

Thus, in the specific example of FIG. 5, the memory cells C'11, C'12, and C'13 of the row of index k equal to 1 each receive the same control voltage V1_pwm, the memory cells C'21, C'22, and C'23 of the row of index k equal to 2 each receive the same control voltage V2_pwm, the memory cells C'31, C'32, and C'33 of the row of index k equal to 3 each receive the same control voltage V3_pwm, and the memory cells C'41, C'42, and C'43 of the row of index k equal to 4 each receive the same control voltage V4_pwm.

In this example of embodiment, device 2 thus comprises one circuit PWMk per row, with k being an integer index ranging from 1 to P.

In the specific example of FIG. 5, device 2 thus comprises a circuit PWM1 delivering voltage V1_pwm based on digital weight V1_n, a circuit PWM2 delivering voltage V2_pwm based on digital weight V2_n, a circuit PWM3 delivering voltage V3_pwm based on digital weight V3_n, and a circuit PWM4 delivering voltage V4_pwm based on digital weight V4_n.

The assembly of the circuits PMWk taken with a circuit CTRL delivering digital words Vk_n, with k being an integer index ranging from 1 to P, forms, for example, a circuit for controlling the P rows of the array.

In this example of embodiment, N memory cells of a same column, here the column of index u equal to 3, are used to implement an in-memory computing. In the specific example of FIG. 5, N is equal to 3 and memory cells C'13, C'23, and C'33 are used to implement an in-memory computing. These N memory cells C'ku then have their outputs coupled, for example connected in the example of FIG. 5, to a same node 500. Node 500 is, like the node 200 previously described in relation with FIG. 2, configured to receive the output currents of the N memory cells C'ku during the time period D1 corresponding to the in-memory computing using these N memory cells.

Further, a circuit INT/ADC has its input 202 connected to node 500.

Thus, during a period D1 corresponding to this in-memory computing, control voltages Vk_pwm are delivered to the N memory cells C'ku, the N memory cells C'ku then supply output currents Iku_pwm (I13_pwm, I23_pwm, and I33_pwm in the specific example of FIG. 5) to node 500, and the circuit INT/ADC connected to node 500 delivers signal V_n based on the total quantity of current received by its input 202 during this period D1.

As an example, as shown in FIG. 5 for the column of index u equal to 3, all the memory cells C'uk of a same column have their outputs connected to a same node, node 500 in this example, itself connected to the input 202 of a circuit INT/ADC. In particular, as shown in FIG. 5 by dotted lines, memory cell C'43 is connected to node 500 while it does not take part in the in-memory computing using the N memory cells C'13, C'23, C'33. In this case, for a memory cell C'ku of the column which does not take part in the in-memory computing, that is, memory cell C'43 in the specific example of FIG. 5, not to alter the result of the calculation, it must not, during time period D1, deliver an output current I43_pwm to node 500 or deliver a zero output current I43_pwm to node 500.

For this purpose, the corresponding word V4_n is set to a minimum value, for example zero, so that voltage V4_pwm remains at its second low level during the entire time period D1, whereby current I43_pwm remains equal to during the entire time period D1.

As an alternative example, in each column, the memory cell(s) which do not take part in the implementation of an in-memory computing using the other memory cells in the column are not connected to the connection node which is connected to the input 202 of circuit INT/ADC. Taking the specific example of FIG. 5, memory cell C'43 is then not connected to node 500.

Preferably, in an embodiment where the M memory cells are organized in an array of P rows and L columns, and where all the memory cells of a same row receive, at each time period D1, the same row control voltage Vk_pwm, with k the index of this row, the memory cells C'ku of the array further comprise a column selection input such as previously described. In this case, the memory cells of a same column for example receive the same selection signal selu, with u being an integer index ranging from 1 to L.

For example, as shown in FIG. 5, the memory cells of the column of index u equal to 1 receive signal sel1, the memory cells of the column of index u equal to 2 receive signal sel2, and the memory cells of the column of index u equal to 3 receive signal sel3. As an example, signals selu are delivered by a circuit SEL of device 2, for example a column control circuit SEL.

Thus, during the implementation of an in-memory computing using memory cells of a single column of index u, the memory cells of this column receive a selection signal selu at a value enabling the memory cells in this column to supply output currents determined by the control voltages Vk_pwm received by memory cells of this column and by the weight programmed in these memory cells. Conversely, the memory cells of the other columns of the array receive selections signals selu at a value forcing the output current supplied by each of these memory cells to a constant and zero value whatever the level of the control voltage Vk_pwm received by this memory cell.

Although this is not illustrated in FIG. 5, device 2 may comprise more than one circuit INT/ADC, for example exactly one circuit INT/ADC per column of the array. For example, in the device 2 of FIG. 4, in each column of the array, the outputs of all the memory cells in the column are then connected to the circuit INT/ADC of this column.

Alternatively or complementarily, for each column, device 2 may comprise a plurality of circuits INT/ADC, for example a first circuit INT/ADC connected or coupled to the outputs of first memory cells in the column and a second circuit INT/ADC connected or coupled to the outputs of second memory cells in the column. This, for example, enables to simultaneously implement a plurality of in-memory computing operations during a same time period D1 and with the memory cells of a single column. For example, taking the device 2 of FIG. 5, rather than connecting the output of memory cell C'43 to the shown circuit INT/ADC, the output of this memory cell is connected to another circuit INT/ADC.

In the example shown in FIG. 2, respectively in FIG. 5, the outputs of all the memory cells C'i, respectively C'ku, taking part in the implementation of an in-memory computing during a corresponding time period D1, are connected to node 200, respectively 500, itself connected to the input 202 of a corresponding circuit INT/ADC.

However, it may be desirable, to make device 2 simply reconfigurable, for the memory cells which supply, during a given time period D1, output currents to a node connected to the input 202 of a corresponding circuit INT/ADC, to be at least partly different from the memory cells which supply, during another time period D1, output currents to this same node.

For this purpose, as already mentioned in relation with FIG. 2, each circuit INT/ADC of device 2, and, more widely, each connection node, for example 200 in FIGS. 2 and 500 in FIG. 5, configured to receive the output currents of N memory cells of device 2 during a time period D1 of the implementation of an in-memory computing, may be coupled to the outputs of these N memory cells and, for example, to the outputs of one or a plurality of other memory cells among the M memory cells of device 2 by a connection network controllable by a control circuit of the network.

In this case, the connection network has inputs connected to the outputs of these memory cells, and an output connected to the connection node. The control circuit of the connection network is then configured, during time period D1, to control the network so that the connection node receives the output current of each of the N memory cells utilized in the in-memory computing implemented during this time period D1. The control circuit of the network is further configured, during time period D1, to control the network so that the outputs of the other memory cells which are connected to the inputs of the network and which are not utilized in the in-memory computing implemented during this time period D1 are electrically insulated from the connection node. In other words, network R and/or its control circuit are configured so that, during a time period D1, the connection node connected to the output of network R receives the output currents only from the memory cells utilized in the in-memory computing corresponding to this time period D1.

Figure 6:
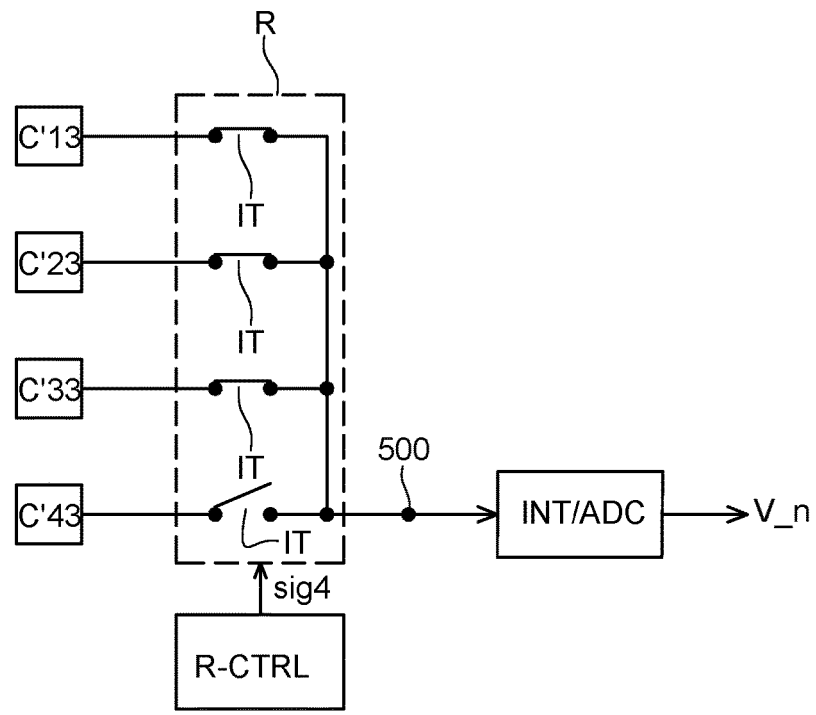
FIG. 6 schematically shows in the form of blocks an alternative embodiment of the devices of FIGS. 2 and 5.

FIG. 6 schematically shows in the form of blocks an alternative embodiment of the devices 2 of FIGS. 2 and 5, in the case where device 2 comprises a connection network R such as described hereabove, it being understood that device 2 may comprise more than one network R, for example one network R per circuit INT/ADC of device 2.

The specific example of FIG. 6 corresponds to the specific example of FIG. 5 where, during a time period D1, memory cells C'13, C'23, and C'33 are utilized in the implementation of an in-memory computing and where memory cell C'43 is not and must supply no output current I43_pwm to node 500.

Network R then comprises four inputs connected to the respective outputs of memory cells C'13, C'23, C'33, and C'43, and an output connected to node 500, itself connected to the input 202 of circuit INT/ADC.

Device 2 further comprises a circuit R_CTRL for controlling network R. Circuit R_CTRL supplies network R with a control signal sig4. Signal sig4, for example a digital word over a plurality of bits, determines, for a given period D1, which of the inputs of network R is or are electrically coupled to the output of network R by network R, and which of the inputs of network R is or are electrically insulated from the output of network R.

As an example, network R comprises, for each of its inputs connected to the output of a corresponding memory cell C'ku, a switch IT connected between this input of the network and the output of network R. The switches are controlled by signal sig4. It will, however, be within the abilities of those skilled in the art to provide other examples of implementation of network R.

In the specific example of FIG. 6, over the entire the duration D1 of an in-memory computing using memory cells C'13, C'23, and C'33, control circuit R_CTRL controls network R so that the output of each of these memory cells is electrically coupled to the output of the network, so that the output currents supplied by these memory cells are delivered to node 500 where they add. Further, during this same time period D1, circuit R_CTRL controls network R so that its input connected to the output of memory cell C'43 is electrically insulated from the output of network R, and thus from node 500.

In the example of FIG. 6 where network R is implemented by switches IT, the switch IT connected between the output of memory cell C'13 and node 500, the switch IT connected between the output of memory cell C'23 and node 500, and the switch IT connected between the output of memory cell C'33 and node 500 are set to the on state by circuit R_CTRL for the entire duration D1 of the in-memory computing, and the switch IT connected between the output of memory cell C'43 and node 500 is set to the on state for this entire time period D1.

Although in the example of FIG. 6, the memory cells C'13 to C'43 which have their outputs connected to corresponding inputs of network R all form part of a same column, this is not compulsory. Indeed, the network R of device 2 may have inputs connected to any of the M memory cells of device 2, for example to memory cells of two different columns of the array.

The embodiments and variants of devices 2 described hereabove in relation with FIGS. 2 to 6 enable to implement an in-memory computing method. The method then comprises, during a time period D1, the following steps: supplying a connection node (200 in FIG. 2, 500 in FIGS. 5 and 6) with the output currents of a plurality N of memory cells among the M memory cells of the device; delivering, with a circuit INT/ADC having an input 202 connected to the connection node, an output signal V_n having a value determined by a total quantity of current IS_pwm received by this input 202 of circuit INT/ADC all along this time period D1; and for each of the N memory cells, receiving a digital word V1_n, V2_n, V3_n, V4_n with a circuit PWM1, PWM2, PWM3, PWM4 and delivering with this circuit PWM1, PWM2, PWM3, PWM4 the control voltage V1_pwm, V2_pwm, V3_pwm, V4_pwm of the memory cell at a first level, preferably non zero, for a time period D2 determined by the received digital weight.

Various embodiments and variants have been described. Those skilled in the art will understand that certain features of these various embodiments and variants may be combined, and other variants will occur to those skilled in the art.

In particular, although memory cells having a control input and, for example, a selection input, have been mentioned herein, memory cells comprising additional inputs may be used in the described devices 2.

Further, as briefly mentioned in relation with FIG. 5, device 2 may comprise a plurality of circuits INT/ADC, or, in other words, a plurality of connection nodes each configured to receive, during a same time period D1, the output currents of corresponding memory cells, so that a plurality of in-memory computing operations are implemented simultaneously in device 2 during this time period D1.

Finally, the practical implementation of the described embodiments and variants is within the abilities of those skilled in the art based on the functional indications given hereabove.

In particular, as for the implementation of circuits PWMi, as has already been indicated, it is not limited to what has been described in relation with FIG. 3, and, more generally, is not limited to circuits PWMi comprising counters.

Similarly, regarding the implementation of circuits INT/ADC, it is not limited to what has been described in relation with FIG. 4.

Further, although this has not been specified yet, those skilled in the art will understand that, during a given time period D1, the control voltage received by a memory cell utilized in the corresponding in-memory computing is at its first level only during time period D2 (while time period D2 may be continuous or not, and may further be zero or on the contrary equal to D1), and at its second level during the rest of time period D1, that is, during a time period D3 equal to D1 minus D2 (while time period D3 may be continuous or not, and may further be equal to D1 or on the contrary be zero).

To implement the described memory cells, those skilled in the art may use memory cells designated by sign eSTM, or, more generally, non-volatile memory cells with at least two programming levels ("multi-level memory cell").

The invention claimed is:

1. A device configured to implement in-memory computing, comprising:
  memory cells wherein each memory cell has a control input configured to receive a pulse-width modulated control voltage and an output configured to supply an output current having a value at least partly determined by the pulse-width modulated control voltage and by a weight programmed in said memory cell;
  a connection node configured to receive, during a first time period, output currents from the outputs of a plurality of memory cells among said memory cells;
  a first circuit having an input connected to the connection node and configured to deliver an output signal having a value determined by a total quantity of current received by the input of the first circuit during the first time period; and
  for each memory cell of the plurality of memory cells, a second circuit configured to receive a digital word and to deliver, during the first time period, the pulse-width modulated control voltage at a first level only during a second time period determined by said digital word.

2. The device according to claim 1, wherein the value of the output current from each memory cell is determined by the pulse-width modulated control voltage and by the weight programmed in said memory cell.

3. The device according to claim 1, wherein each memory cell further comprises a selection input and is configured so that:
  the value of the output current is at a zero current value when the selection input of the memory cell receives a selection signal in a first state; and
  the value of the output current is at a non-zero current value determined by the pulse-width modulated control voltage and the weight programmed in the memory cell when the selection input of the memory cell receives the selection signal in a second state different from the first state.

4. The device according to claim 3, wherein the device further comprises a selection circuit configured to deliver, to each memory cell of the plurality of memory cells, the selection signal of the memory cell.

5. The device according to claim 1, wherein each second circuit is configured so that the pulse-width modulated control voltage delivered by this second circuit comprises exactly two levels, wherein said first level is one of said two levels.

6. The device according to claim 1, wherein the first node is connected to the output of each of the memory cells of the plurality of memory cells.

7. The device according to claim 1, wherein the device further comprises:
  a connection network configured to selectively connect outputs of the plurality of memory cells to the first node; and
  a control circuit configured, during the first time period, to control selective connection by the connection network so that the first node receives output currents of only selected ones of the plurality of memory cells.

8. The device according to claim 7, wherein said memory cells selectively connected by the connection network comprise memory cells involved in the in-memory computing and other memory cells not selectively connected by the connection network comprise memory cells not involved in the in-memory computing.

9. The device according to claim 1, wherein the first circuit comprises an integrator circuit configured to integrate the output current received by the first circuit during the first time period and to deliver a first signal determined by said integration.

10. The device according to claim 9, wherein the first signal is an analog signal and the first circuit further comprises an analog-to-digital converter configured to convert the analog signal into a digital signal determining the output signal of the first circuit.

11. The device according to claim 1, wherein the first circuit comprises:
  an oscillator having an oscillation frequency controlled by the output current available on the first node, and
  a counter configured to deliver a digital signal having a value determined by a number of oscillations counted during the first time period, the output signal of the first circuit being determined by the digital signal delivered by the counter.

12. The device according to claim 1, wherein the first time period is equal to K times one period of a clock, with K being a constant number, and wherein the second time period is equal to Q times the clock period, with Q being a number smaller than or equal to number K.

13. The device according to claim 12, wherein numbers K and Q are integers.

14. The device according to claim 12, wherein each second circuit comprises a counter configured to:
  receive the digital word received by said second circuit;
  count, during the first time period, a number of periods of the clock; and
  deliver, during the first time period, an output signal in a first binary state when the counted number of periods is smaller than a value determined by said digital word, and in a second binary state otherwise;
  said second circuit being further configured to deliver said pulse-width modulated control voltage at the first level when the output signal of the counter is in the first binary state.

15. The device according to claim 12, wherein number K is determined by a maximum value of the digital words and number Q is determined by a value of the digital word received by the second circuit delivering the control voltage to said memory cell.

16. A method implemented in a device, comprising memory cells wherein each memory cell has a control input configured to receive a pulse-width modulated control voltage and an output configured to supply an output current having a value at least partly determined by the pulse-width modulated control voltage and by a weight programmed in said memory cell, the method comprising, during a first time period:
  supplying to a connection node the output currents of a plurality of memory cells among said memory cells;
  delivering with a first circuit having an input connected to the first node, an output signal having a value determined by a total quantity of current received by the input of the first circuit during the first time period; and
  delivering to each memory cell of the plurality of memory cells a pulse-width modulated control voltage in response to receipt of a digital word, the pulse-width modulated control voltage having a first level only during a second time period determined by the received digital word.

17. The method according to claim 16, further comprising, for each memory cell of the plurality of memory cells:
generating the value of the output current at a zero current value when a selection input of the memory cell receives a selection signal in a first state; and
generating the value of the output current is at a non-zero current value determined by the pulse-width modulated control voltage and the weight programmed in the memory cell when the selection input of the memory cell receives the selection signal in a second state different from the first state.

18. The method according to claim 16, further comprising:
selectively connecting outputs of the memory cells to the first node; and
during the first time period, controlling the selective connection so that the first node receives output currents of only selected ones of the memory cells.

19. The method according to claim 18, wherein said memory cells selectively connected by the connection network comprise memory cells involved in the in-memory computing and other memory cells not selectively connected by the connection network comprise memory cells not involved in the in-memory computing.

* * * * *